(12) United States Patent
Konishi (10) Patent No.: US 10,776,657 B2
(45) Date of Patent: *Sep. 15, 2020

(54) TEMPLATE CREATION APPARATUS, OBJECT RECOGNITION PROCESSING APPARATUS, TEMPLATE CREATION METHOD, AND PROGRAM

(71) Applicant: OMRON Corporation, Kyoto-shi, Kyoto (JP)

(72) Inventor: Yoshinori Konishi, Souraku-gun (JP)

(73) Assignee: OMRON CORPORATION, Kyoto-shi (JP)

( * ) Notice: Subject to any disclaimer, the term of this patent is extended or adjusted under 35 U.S.C. 154(b) by 138 days.

This patent is subject to a terminal disclaimer.

(21) Appl. No.: 16/034,450

(22) Filed: Jul. 13, 2018

(65) Prior Publication Data

US 2019/0095749 A1    Mar. 28, 2019

(30) Foreign Application Priority Data

Sep. 22, 2017   (JP) ................................. 2017-182517

(51) Int. Cl.
  *G06K 9/62*   (2006.01)
  *G06K 9/00*   (2006.01)
  *G06K 9/46*   (2006.01)

(52) U.S. Cl.
  CPC ....... *G06K 9/6202* (2013.01); *G06K 9/00201* (2013.01); *G06K 9/00208* (2013.01);
  (Continued)

(58) Field of Classification Search
  CPC ......... G06K 2009/3225; G06K 9/3216; G06K 9/3275; G06K 9/4638; G06K 9/4652; G06K 9/62; G06K 9/38; G06K 9/6251
  See application file for complete search history.

(56) References Cited

U.S. PATENT DOCUMENTS 10,452,989 B2 * 10/2019 Majumdar ............. G06N 10/00
2010/0329556 A1 * 12/2010 Mitarai ..................... G06K 9/38
                                                              382/170

(Continued)

FOREIGN PATENT DOCUMENTS

JP    5271031 B2    8/2013
JP    2015-79374 A    4/2015

OTHER PUBLICATIONS

Andrea Frome et al, "Recognizing Objects in Range Data Using Regional Point Descriptors", Serious Games, Jan. 1, 2004, pp. 224-237, vol. 3023, Springer International Publishing. Relevance is indicated in the extended European search report dated Jan. 28, 2019.

(Continued)

*Primary Examiner* — Diane D Mizrahi
(74) *Attorney, Agent, or Firm* — Metrolex IP Law Group, PLLC (57) ABSTRACT

A template creation apparatus includes a three-dimensional data acquisition unit that acquires three-dimensional data of an object that is a recognition target, a normal vector calculation unit that calculates a normal vector at a feature point of an object viewed from a predetermined viewpoint that is set for the object, a normal vector quantization unit that quantizes a normal vector by mapping the normal vector to a reference region on a plane orthogonal to an axis that passes through the viewpoint, so as to acquire a quantized normal direction feature amount, the reference region including a central reference region corresponding to the vicinity of the axis and a reference region in the periphery of the central reference region, a template creation unit that creates a template for each viewpoint based on the quantized normal direction feature amount, and a template information output unit that outputs the template.

16 Claims, 7 Drawing Sheets

(52) U.S. Cl.
CPC ........... *G06K 9/468* (2013.01); *G06K 9/6255* (2013.01); *G06K 9/4642* (2013.01)

(56) References Cited

U.S. PATENT DOCUMENTS

2014/0072217 A1     3/2014  Xu et al.
2016/0328253 A1*   11/2016  Majumdar ............. G06N 10/00
2019/0197727 A1*    6/2019  Konishi .................... G06T 7/74

OTHER PUBLICATIONS

Federico Tombari et al, "Unique Shape Context for 3D Data Description", 3D object retrieval, Oct. 25, 2010, pp. 57-62, ACM, New York. Relevance is indicated in the extended European search report issued on Jan. 28, 2019.

The extended European search report dated Jan. 28, 2019 in a counterpart European patent application.

* cited by examiner

TEMPLATE CREATION APPARATUS, OBJECT RECOGNITION PROCESSING APPARATUS, TEMPLATE CREATION METHOD, AND PROGRAM

CROSS-REFERENCES TO RELATED APPLICATIONS

This application claims priority to Japanese Patent Application No. 2017-182517 filed Sep. 22, 2017, the entire contents of which are incorporated herein by reference.

FIELD

The disclosure relates to a technique for creating a template used for object recognition through template matching.

BACKGROUND

From among methods for recognizing a target object from an image, there is a method called template matching. Basic processing of template matching is to prepare, in advance, a template of an object that is a recognition target, and evaluate the degree of matching of image feature between an input image and the template so as to recognize the position and orientation of the object in the image. Object recognition using template matching is practically used in various fields such as inspection and picking in FA (Factory Automation), robot vision, and surveillance cameras.

Conventionally, in template matching in which a recognition target is a three-dimensional object, flat surfaces of the object and normal line information thereof are used as feature amounts in order to reduce a calculation amount and calculation time while maintaining an accurate recognition result (e.g., JP 2015-079374A).

In addition, when edge information is used as a feature amount in template matching, it is known that a reduction in the data amount and an increase in processing speed are realized by using a feature amount acquired by converting the value of an edge angle that is 0 to 360 degrees into 8-bit data that is set in units of 45 degrees (which is acquired by dividing 360 degrees by eight) (for example, JP 5271031).

Figure 7A:
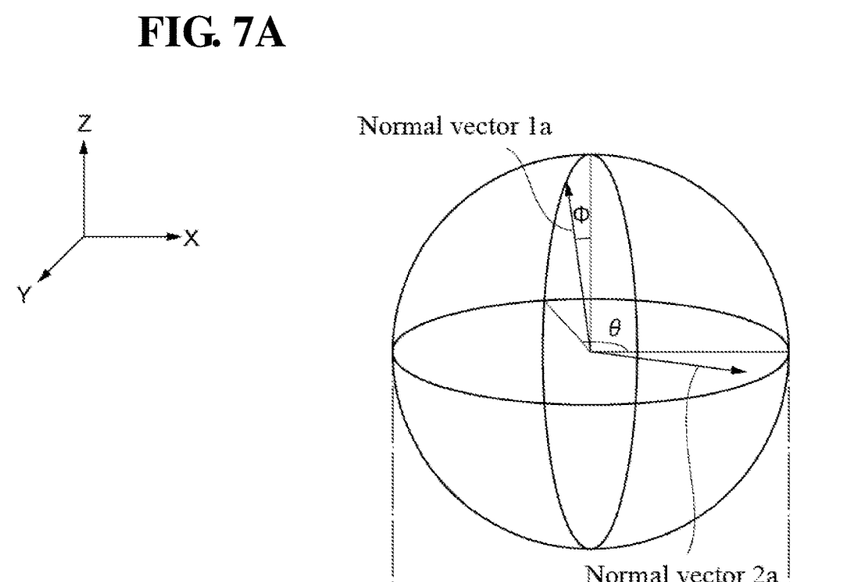
FIGS. 7A and 7B are conceptual diagrams illustrating conventional quantization of a normal vector.
Figure 7B:
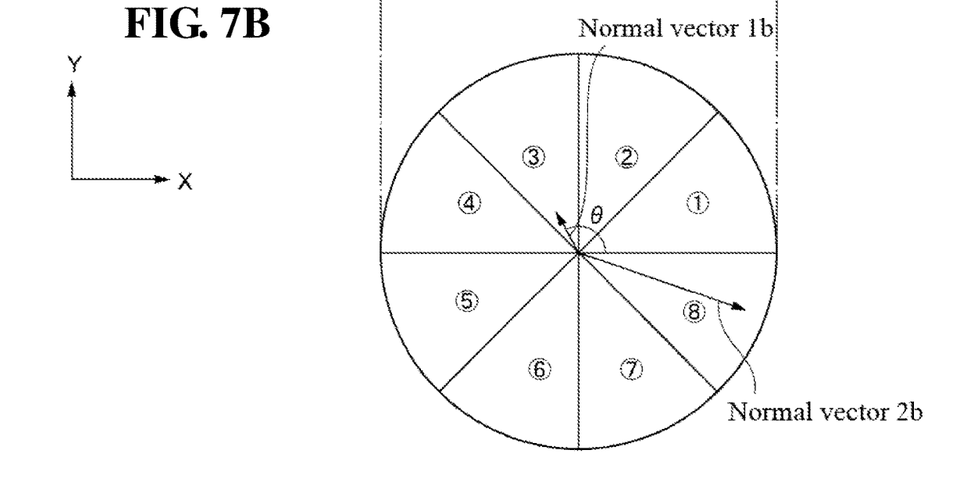

As shown in FIGS. 7A and 7B, conventionally, when normal line information is used as a feature amount, an angle $\theta$ between the x axis and a vector acquired by mapping a normal vector onto an xy two-dimensional space is quantized so as to acquire the feature amount of a normal vector. For example, in the example in FIGS. 7A and 7B, feature amounts have been acquired by mapping normal vectors in a unit sphere shown in FIG. 7A, onto a two-dimensional space shown in FIG. 7B including reference regions 1 to 8 corresponding to eight segments acquired by equally dividing, by eight, an XY plane that passes through the center of the unit sphere, and quantizing the mapped normal vectors. For example, a normal vector 1*b* in FIG. 7B corresponds to a normal vector 1*a* in FIG. 7A, and similarly, a normal vector 2*b* corresponds to a normal vector 2*a*. The magnitude of the normal vector 1*b* corresponds to sin $\Phi$ of the normal vector 1*a*.

Here, boundaries between the reference regions 1 to 8 concentrate in the vicinity of the z axis. Therefore, if, from among normal vectors extracted from an image in which a recognition target object is captured, the normal vector 1*a* that forms a small angle $\Phi$ with the camera optical axis (the z axis) of the camera that acquired the image is recognized to be different from the normal vector that is naturally recognized as that of the recognition target object due to being slightly influenced by noise, a measurement error, or the like, the vector is likely to be mapped to a different reference region in the xy two-dimensional space, and as a result, a resulting feature amount after quantization is also likely to be different. Therefore, in the case where an axis that passes through a viewpoint when registering a template matches the optical axis of the camera that acquired the input image in which the recognition target object is captured, the feature amounts of the template and the input image in which the recognition target object is captured do not match at a feature point that has a normal vector that forms a small angle $\Phi$ with the camera optical axis, which leads to a deterioration in recognition accuracy.

In view of this, one or more aspects may provide a template creation apparatus, an object recognition processing apparatus, a template creation method, and a program that can improve the recognition accuracy by using a template that is unlikely to be affected by a change in the vector direction of a normal vector that forms a small angle with the camera optical axis.

SUMMARY

A template creation apparatus according to one aspect has a three-dimensional data acquisition unit that acquires three-dimensional data indicating a three-dimensional shape of an object that is a recognition target, a normal vector calculation unit that calculates, based on the three-dimensional data, a normal vector at a feature point of the object viewed from a predetermined viewpoint that is set for the object, a normal vector quantization unit that quantizes the calculated normal vector by mapping the calculated normal vector to a reference region on a plane orthogonal to an axis that passes though the viewpoint, so as to acquire a quantized normal direction feature amount, the reference region including a central reference region corresponding to the vicinity of the axis and a reference region in the periphery of the central reference region, a template creation unit that creates, for each viewpoint, based on the acquired quantized normal direction feature amount, a template to be used for object recognition that is performed through template matching, and a template information output unit that outputs the created template.

According to an aspect, the reference region includes a central reference region corresponding to the vicinity of the axis, and therefore, even in the case where the direction of a normal vector that forms a small angle with an axis that passes through a viewpoint changes due to noise, a measurement error, and the like, it is possible to acquire a certain quantized normal direction feature amount. By acquiring a feature amount that is unlikely to be affected by a change in the normal vector direction due to noise, a measurement error, and the like, it is possible to improve the recognition accuracy compared with a conventional piece of technology.

In the above-described template creation apparatus, the peripheral reference region may include a plurality of reference regions corresponding to a plurality of segments acquired by equally dividing a three-dimensional unit sphere. According to an aspect, segments acquired by equally dividing a three-dimensional unit sphere are associated with reference regions, and thus it is possible to accurately understand feature amounts of dispersed normal vectors.

In the above-described template creation apparatus, the central reference region may be set based on an angle $\Phi$ between a normal vector and the axis. According to an aspect, an allowable predetermined central reference region can be easily set based on the relationship between the angle Φ and a change in the normal vector direction due to noise and a measurement error.

In the above-described template creation apparatus, the central reference region may be a circle that is obtained in a case where the angle Φ is set to a predetermined angle, and whose radius is sin Φ. According to an aspect, an allowable predetermined central reference region can be easily set based on the relationship between sin Φ and a change in the normal vector direction due to noise and a measurement error.

In the above-described template creation apparatus, the normal vector quantization unit may quantize a normal vector such that a reference region in the periphery of a reference region to which the normal vector that is a quantization target belongs is allowed. According to an aspect, even in a case where, at the time of object recognition, the normal vector of a feature point in an input image is mapped to a reference region in the periphery of a naturally envisioned reference region due to noise and a measurement error, it is possible to calculate a collation score, and determine that the normal vector has not changed. By realizing such a robust feature amount on the template creation apparatus side, it is possible to set a peripheral reference region that is allowed, without increasing the processing load at the time of object recognition.

An object recognition processing apparatus according to another aspect that performs object recognition using a template created by the above template creation apparatus has an image acquisition unit that acquires an input image, a normal vector calculation unit that calculates a normal vector at a feature point in the input image, a normal vector quantization unit that quantizes the calculated normal vector by mapping the calculated normal vector to a reference region on a plane orthogonal to an optical axis of a camera that acquired the input image, so as to acquire a quantized normal direction feature amount, the reference region including a central reference region corresponding to the vicinity of the optical axis and a reference region in the periphery of the central reference region, a template matching unit that searches for a position of the object in the input image based on the template and the quantized normal direction feature amount acquired by the normal vector quantization unit, and acquires a collation result, and a recognition result output unit that outputs a recognition result that is based on the collation result.

In the above-described object recognition processing apparatus, the peripheral reference region may include a plurality of reference regions corresponding to a plurality of segments acquired by equally dividing a three-dimensional unit sphere.

In the above-described object recognition processing apparatus, the central reference region may be set based on an angle Φ between a normal vector and the axis.

In the above-described object recognition processing apparatus, the central reference region may be a circle that is obtained in a case where the angle Φ is set to a predetermined angle, and whose radius is sin Φ.

In the above-described object recognition processing apparatus, the normal vector quantization unit may quantize a normal vector such that a reference region in the periphery of a reference region to which the normal vector that is a quantization target belongs is additionally allowed. According to an aspect, even in the case where, at the time of object recognition, the normal vector of a feature point in an input image is mapped to a reference region in the periphery of a naturally envisioned reference region due to noise and a measurement error, it is possible to calculate a collation score, and determine that the normal vector has not changed. By realizing such a robust feature amount on the object recognition processing apparatus side, it is possible to set a peripheral reference region that is allowed, based on a condition unique to each object recognition processing apparatus.

A template creation method according to another aspect that is executed by a computer includes a step of acquiring three-dimensional data indicating a three-dimensional shape of an object that is a recognition target, a step of calculating, based on the three-dimensional data, a normal vector at a feature point of the object viewed from a predetermined viewpoint that is set for the object, a step of quantizing the calculated normal vector by mapping the calculated normal vector to a reference region on a plane orthogonal to an axis that passes though the viewpoint, so as to acquire a quantized normal direction feature amount, the reference region including a central reference region corresponding to the vicinity of the axis and a reference region in the periphery of the central reference region, a step of creating, for each viewpoint, based on the acquired quantized normal direction feature amount, a template to be used for object recognition that is performed through template matching, and a step of outputting the created template.

A program according to another aspect causes a computer to execute a step of acquiring three-dimensional data indicating a three-dimensional shape of an object that is a recognition target, a step of calculating, based on the three-dimensional data, a normal vector at a feature point of the object viewed from a predetermined viewpoint that is set for the object, a step of quantizing the calculated normal vector by mapping the calculated normal vector to a reference region on a plane orthogonal to an axis that passes though the viewpoint, so as to acquire a quantized normal direction feature amount, the reference region including a central reference region corresponding to the vicinity of the axis and a reference region in the periphery of the central reference region, a step of creating, for each viewpoint, based on the acquired quantized normal direction feature amount, a template to be used for object recognition that is performed through template matching, and a step of outputting the created template.

According to one or more aspects, it is possible to provide a template creation apparatus, an object recognition processing apparatus, a template creation method, and a program that can improve recognition accuracy by using a template that is unlikely to be affected by a change in the vector direction of a normal vector that forms a small angle with the camera optical axis.

DETAILED DESCRIPTION

An embodiment will be described with reference to the attached drawings. Note that the following embodiment is intended for ease of understanding the invention, not for limited interpretation of the invention. Furthermore, the invention may be variously modified without departing from the spirit thereof. Furthermore, a person skilled in the art can adopt an embodiment in which elements to be described below are replaced with equivalents, and such an embodiment is also included in the scope of the invention.

Overall Configuration of Object Recognition Apparatus

According to an embodiment, in template registration processing, object recognition processing, and the like in template matching, normal line information of an object is mapped to a reference region including a region for quantizing normal line information belonging to the vicinity of an axis that passes through a predetermined viewpoint set for the recognition target object when registering a template that is data indicating features of an image when viewed from the viewpoint, and the vicinity of the optical axis of a camera that acquires an input image of the recognition target object when performing object recognition processing, and a quantized normal direction feature amount that makes it possible to identify the reference region to which the normal line information was mapped is acquired. Accordingly, a quantized normal direction feature amount that is robust against a measurement error and noise can be acquired for normal line information in the vicinity of the camera optical axis. Here, the overall configuration of an object recognition apparatus according to an embodiment and a scene to which the object recognition apparatus is applied will be described with reference to FIG. 1.

Figure 1:
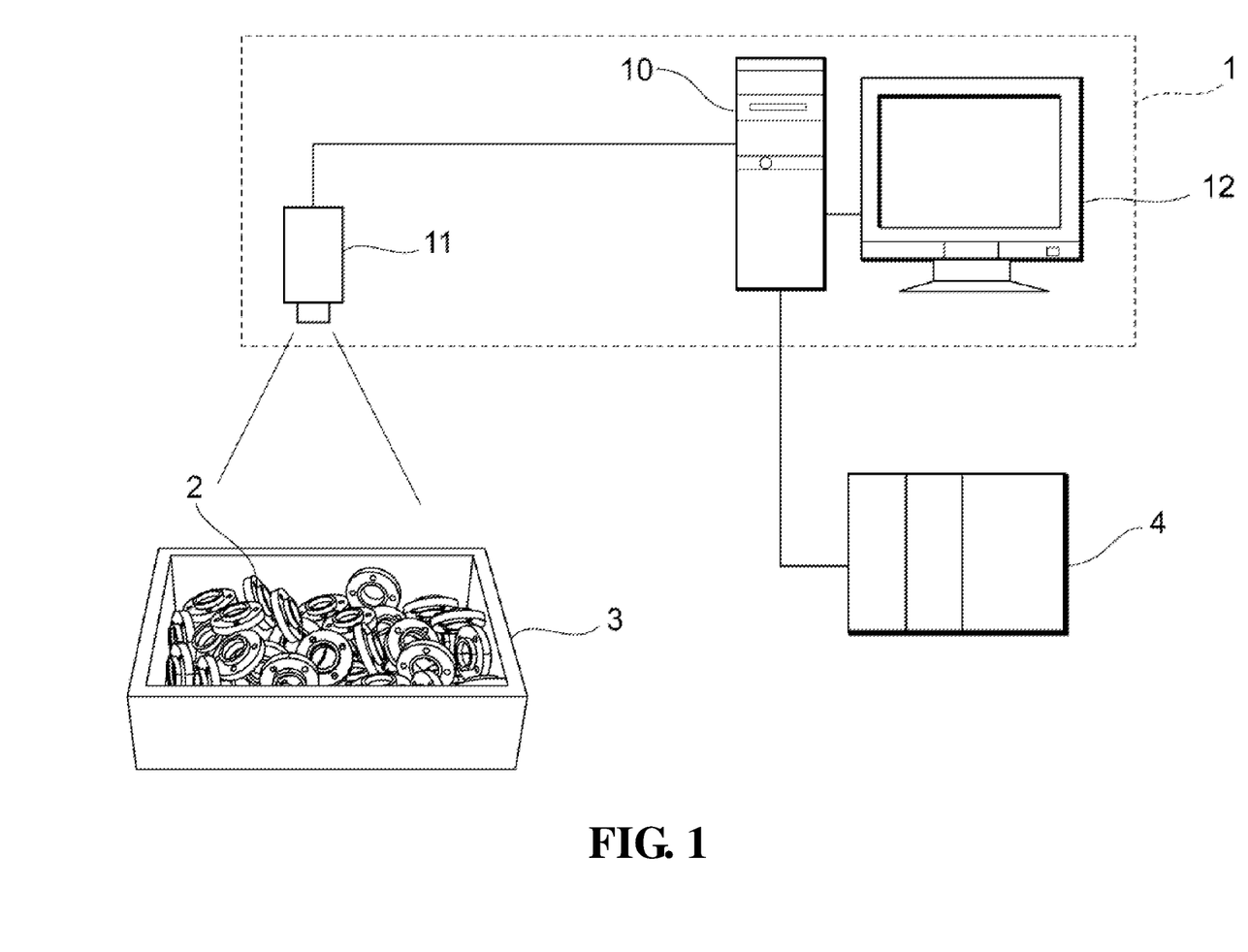
FIG. 1 is a diagram illustrating the overall configuration of an object recognition apparatus.

An object recognition apparatus 1 is a system that is installed in, for example, a manufacturing line, and recognizes an object 2 in a tray 3 using an image imported from a camera 11. The object 2 that is a recognition target is loaded in bulk in the tray 3. The object recognition apparatus 1 imports an image from the camera 11 at a predetermined time interval, executes processing for recognizing a position and orientation of the object 2 included in the image using an image processing apparatus 10, and outputs a result to a PLC (Programmable Logic Controller) 4, a display 12, and the like. The recognition result that is output from the object recognition apparatus 1 is used for, for example, controlling a picking robot, controlling a processing apparatus or a printing apparatus, inspecting or measuring the object 2, and the like.

Hardware Configuration

Figure 2:
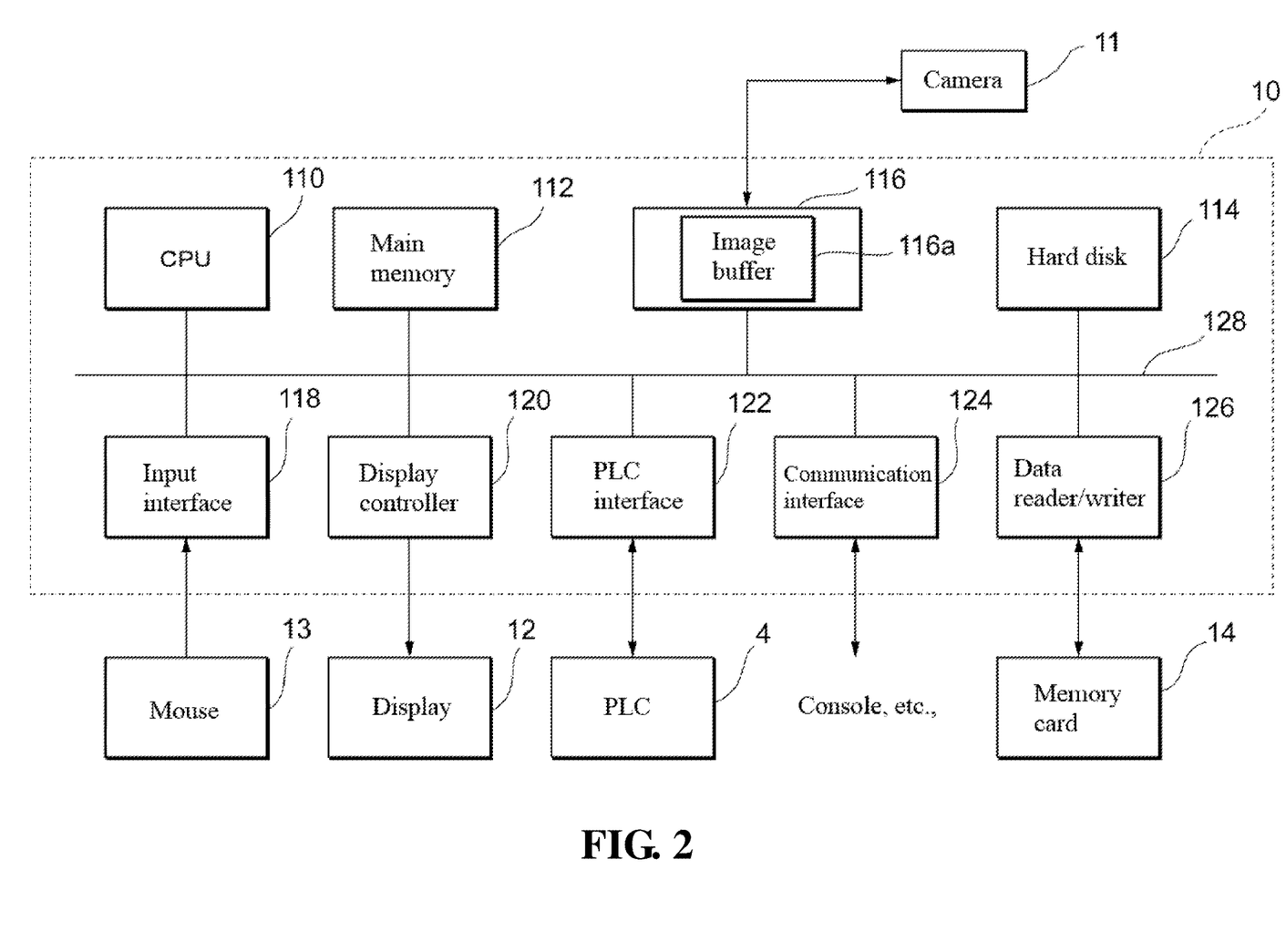
FIG. 2 is a diagram illustrating the hardware configuration of an object recognition apparatus.

The hardware configuration of the object recognition apparatus 1 will be described with reference to FIG. 2. The object recognition apparatus 1 is mainly constituted by the camera 11 and the image processing apparatus 10.

The camera 11 is an image capturing device for importing a digital image of the object 2 to the image processing apparatus 10, and a CMOS (Complementary Metal-Oxide-Semiconductor) camera or a CCD (Charge-Coupled Device) camera is preferably used as the camera 11. An input image may be in any format in terms of resolution, color image/monochrome image, still image/moving image, tone, and data format, and a format can be appropriately selected according to the type of the object 2 and the purpose of sensing. In a case where a special image other than a visible light image, such as an X-ray image or a thermographic image, is used for object recognition and inspection, a camera suitable for that image may be used.

The image processing apparatus 10 includes a CPU 110 equivalent to a hardware processor, a main memory 112 that is used as a work memory, a hard disk 114 that is a fixed storage unit, a camera interface 116, an input interface 118, a display controller 120, a PLC interface 122, a communication interface 124, and a data reader/writer 126. These constituent elements are connected to each other via a bus 128 so as to enable data communication.

The camera interface 116 is a part that mediates data transmission between the CPU 110 and the camera 11, and has an image buffer 116a for temporarily accumulating image data from the camera 11. The input interface 118 mediates data transmission between the CPU 110 and an input unit. The input unit includes a mouse 13, a keyboard, a touch panel, a jog controller, and the like. The display controller 120 is connected to the display 12 such as an LCD monitor, and controls display on the display. The PLC interface 122 mediates data transmission between the CPU 110 and the PLC 4. The communication interface 124 mediates data transmission between the CPU 110 and a console, or between the CPU 110 and a personal computer, a server apparatus, or the like. The data reader/writer 126 mediates data transmission between the CPU 110 and a memory card 14 that is a recording medium. These interfaces are connected to the CPU 110 via an interface such as a USB, as a hardware configuration.

The image processing apparatus 10 can be constituted by a computer having a general-purpose architecture, and executes various types of processing by the CPU 110 reading and executing a program stored in the hard disk 114 or the memory card 14. Such a program is provided in a state of being stored in a computer-readable recording medium such as the memory card 14 or an optical disk, or through the Internet or the like. Note that a program according to an embodiment may be provided as a single application program, or may be provided as a module incorporated in a portion of another program. In addition, a portion or the entirety of processing of such a program may be replaced by a dedicated circuit such as an ASIC.

Software Configuration

Figure 3:
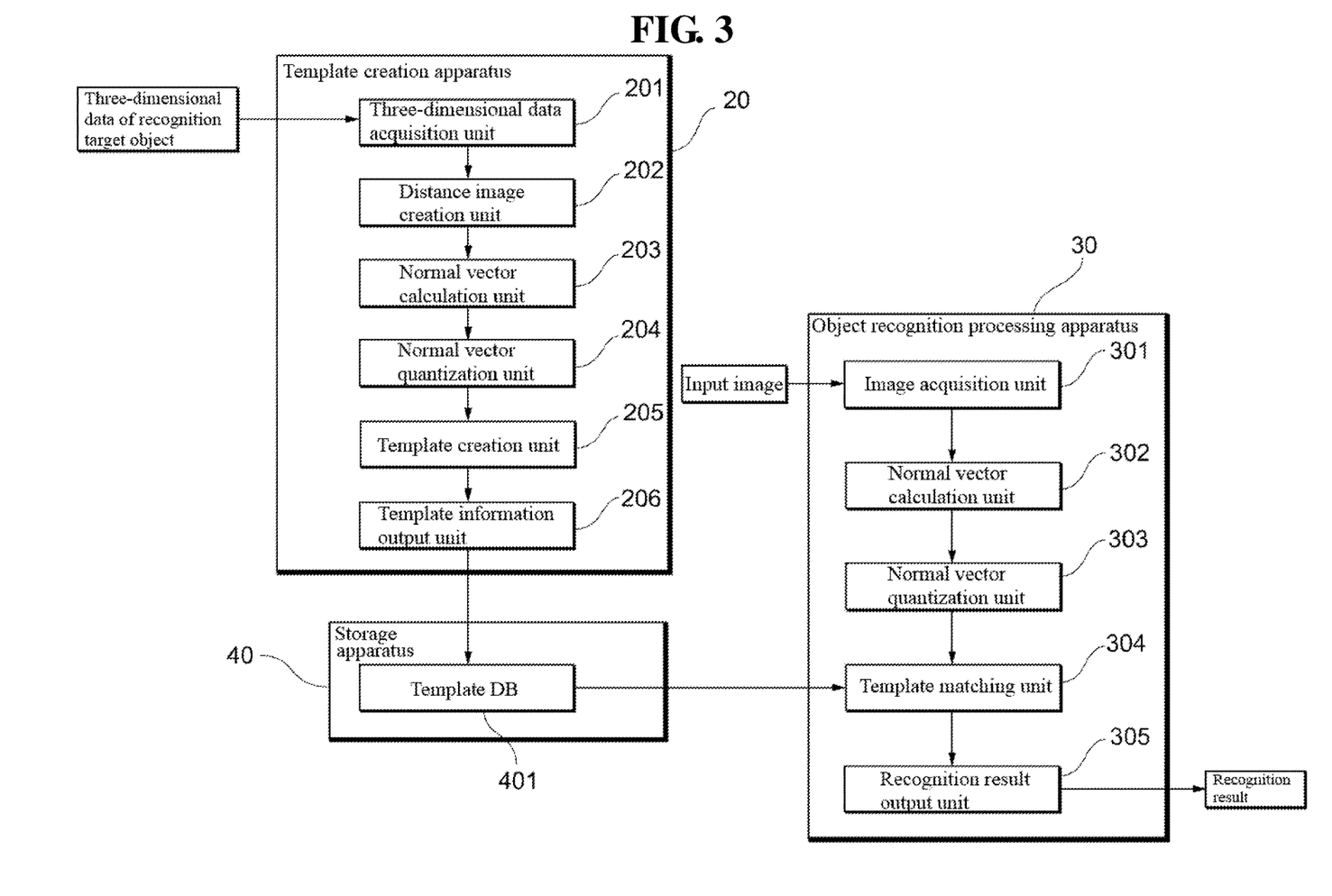
FIG. 3 is a diagram illustrating the software configuration of an image processing apparatus.

FIG. 3 shows the software configuration of the image processing apparatus 10. The image processing apparatus 10 has a processing unit serving as a template creation apparatus 20, a processing unit serving as an object recognition processing apparatus 30, and a storage apparatus 40, and operates as the template creation apparatus 20 or the object recognition processing apparatus 30 by the CPU 110 reading and executing a program stored in the hard disk 114 or the memory card 14. In addition, the storage apparatus 40 is constituted by the hard disk 114.

The template creation apparatus 20 performs processing for creating a template to be used for object recognition processing. The template created by the template creation apparatus 20 is registered to a template database (DB) 401 of the storage apparatus 40. The object recognition processing apparatus 30 performs processing for recognizing an object in an image imported from the camera 11, by executing template matching on the image using the template registered in the template DB 401.

Here, a template described in the present specification is data indicating image features of the object 2 that is a recognition target. Any format can be used for a template, and, for example, it is possible to use an array format in which feature amounts of a plurality of feature points in an image are written. Note that the feature points are positions on the image coordinates indicating predetermined features such as boundaries of an object in an image, and refractive portions and bent portions of the contour line of an object.

The template creation apparatus 20 has a three-dimensional data acquisition unit 201, a distance image creation unit 202, a normal vector calculation unit 203, a normal vector quantization unit 204, a template creation unit 205, and a template information output unit 206. As described above, processing of each constituent element is realized by the CPU 110 reading and executing a program stored in the hard disk 114 or the memory card 14.

The three-dimensional data acquisition unit 201 acquires three-dimensional data indicating the three-dimensional shape of the object 2 that is a recognition target. The three-dimensional data acquisition unit 201 can acquire any three-dimensional data that makes it possible to recognize, as a three-dimensional figure, the object 2 that is a recognition target, and, in an embodiment, acquires three-dimensional CAD data. The three-dimensional data acquisition unit 201 can acquire three-dimensional CAD data from an external three-dimensional CAD server or the like, and can also acquire three-dimensional CAD data from the storage apparatus 40.

The distance image creation unit 202 creates, using three-dimensional data acquired by the three-dimensional data acquisition unit 201, distance images of the object 2 viewed from predetermined viewpoints that have been set for the object 2. In three-dimensional object recognition, even the same object may appear differently according to the viewpoint, and the distance image creation unit 202 creates distance images of the object 2 viewed from any number of viewpoints according to the properties of the object 2 that is a recognition target.

The normal vector calculation unit 203 calculates normal vectors of feature points of the object 2 viewed from a predetermined viewpoint that has been set for the object 2, based on three-dimensional data acquired by the three-dimensional data acquisition unit 201 or distance images of the viewpoints created by the distance image creation unit 202. The normal vector calculation unit 203 defines a plane from three-dimensional data of the feature points and three-dimensional data of points in the periphery of the feature points, and calculates normal vectors of the defined plane. Note that any known technique can be used for detecting feature points and calculating normal vectors, and thus a detailed description thereof is omitted in the present specification.

The normal vector quantization unit 204 quantizes the normal vectors calculated by the normal vector calculation unit 203. In an embodiment, the normal vector quantization unit 204 quantizes the directions of the normal vectors by mapping the normal vectors in a unit sphere, to reference regions in a two-dimensional space formed by x and y axes as shown in FIG. 4B, so as to acquire quantized normal direction feature amounts. Here, an angle Φ in FIG. 4A is an angle between a normal vector A and the z axis.

Figure 4A:
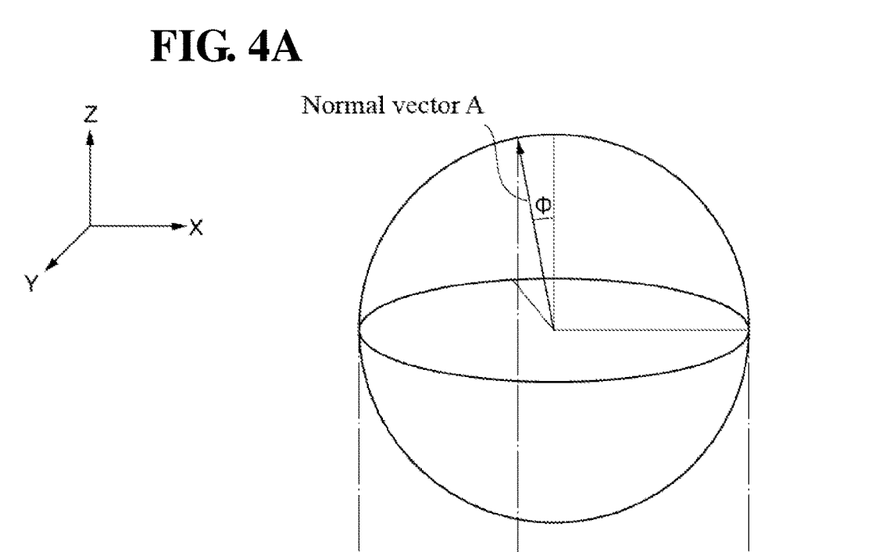
FIGS. 4A and 4B are conceptual diagrams illustrating quantization of a normal vector.
Figure 4B:
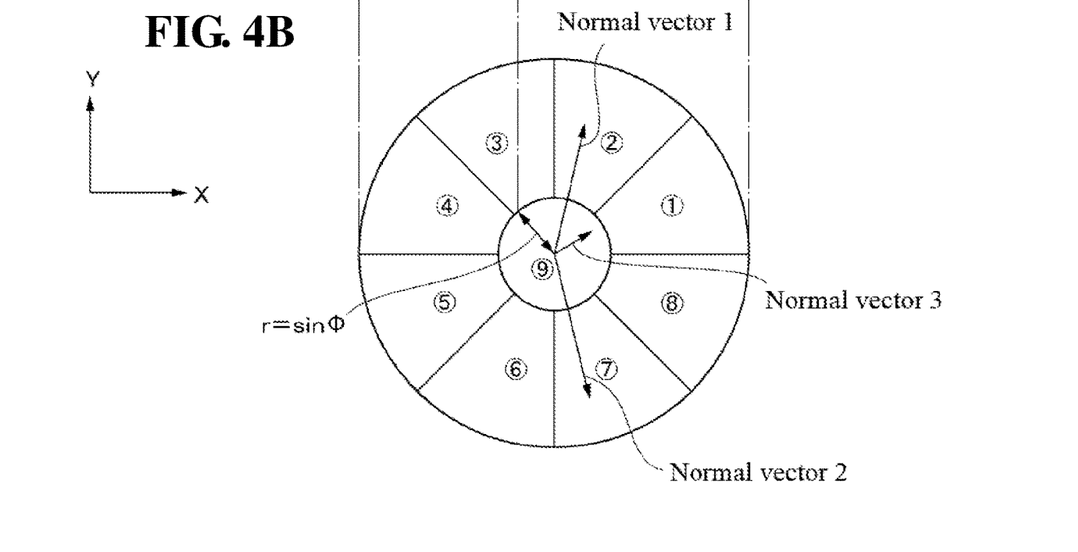

Reference regions 1 to 8 in FIG. 4B correspond to eight segments acquired by equally dividing, by eight, an XY plane that passes through the center of a unit sphere in FIG. 4A. Furthermore, in an embodiment, a central reference region 9 is provided in the vicinity of the camera optical axis based on the angle Φ between the normal vector A and the z axis. Accordingly, the reference region includes the central reference region 9 and peripheral reference regions 1 to 8 formed by line segments that extend radially centered on the z axis at regular intervals. In an embodiment, a circle that is obtained in the case where the angle Φ is set to 10 degrees, and in which sin Φ serves as a radius r is set as the central reference region 9. As shown in FIG. 4B, identification numbers for identifying the reference regions are assigned to the reference regions, and the normal vector quantization unit 204 acquires feature amounts whose bit number corresponding to a reference region to which the normal vector belongs is set, from among 9 bits corresponding to the reference regions 1 to 9.

Note that, in an embodiment, the central reference region 9 is set assuming that the angle Φ is 10 degrees, but the angle Φ can be set to any allowable value, for example, 5 or 15 degrees according to noise and a measurement error. In addition, in an embodiment, the XY plane that passes through the center of the unit sphere is equally divided by eight, but any number of reference regions can be provided, for example, a central reference region 13 that is based on the angle Φ can be provided in addition to reference regions acquired by dividing, by 12, the XY plane that passes through the center of the unit sphere. By using, in this manner, 13-bit feature amounts obtained by providing reference regions acquired by equally dividing, by 12, the XY plane that passes through the center of the unit sphere and an additional central reference region, an information amount that is lost through quantization can be reduced compared with a case where 9-bit feature amounts, which require a two-byte memory similarly, are used.

As shown in FIG. 4B, the normal vector quantization unit 204 quantizes a normal vector 1 of a feature point 1, and acquires a quantized normal direction feature amount (010000000). Similarly, the normal vector quantization unit 204 quantizes a normal vector 2 of a feature point 2, and acquires a quantized normal direction feature amount (000000100). Similarly, the normal vector quantization unit 204 quantizes a normal vector 3 of a feature point 3, and acquires a quantized normal direction feature amount (000000001).

In an embodiment, the normal vector quantization unit 204 can quantize a normal vector such that a reference region in the periphery of a reference region to which the normal vector that is a quantization target belongs is additionally allowed. For example, the normal vector quantization unit 204 can perform quantization such that not only a reference region to which the normal vector belongs but also another reference region that is the closest among the other reference regions is allowed.

The larger the reference region that is allowed is set, the more robust the feature amount can be made, but, on the other hand, if the reference region that is allowed is set to be too large, the recognition accuracy decreases due to a recognition error. Therefore, it is desirable that a reference region that is allowed is set in consideration of a trade-off between a robust feature amount and a recognition error.

The template creation unit 205 creates a template for each viewpoint based on a quantized normal direction feature amount acquired by the normal vector quantization unit 204. Note that a template can include any number of feature amounts besides a quantized normal direction feature amount.

The template information output unit 206 registers a template created by the template creation unit 205 to the template DB 401 of a storage apparatus.

The object recognition processing apparatus 30 has an image acquisition unit 301, a normal vector calculation unit 302, a normal vector quantization unit 303, a template matching unit 304, and a recognition result output unit 305. As described above, processing of each constituent element is realized by the CPU 110 reading and executing a program stored in the hard disk 114 or the memory card 14.

The image acquisition unit 301 acquires an input image from the camera 11. The input image can be any piece of data from which a normal vector can be calculated, such as a distance image.

The normal vector calculation unit 302 calculates normal vectors of feature points in an input image acquired by the image acquisition unit 301.

The normal vector quantization unit 303 quantizes the normal vectors calculated by the normal vector calculation unit 302. The normal vector quantization unit 303 quantizes a normal vector using a reference region used by the normal vector quantization unit 204 when creating a template, and acquires a quantized normal direction feature amount. In an embodiment, nine reference regions consisting of reference regions acquired by equally dividing, by eight, the XY plane that passes through the center of a unit sphere and the additionally provided central reference region 9 that is based on the angle Φ between the normal vector and the z axis.

Similar to the normal vector quantization unit 204, in an embodiment, the normal vector quantization unit 303 can quantize a normal vector such that a reference region in the periphery of a reference region to which the normal vector that is a quantization target belongs is additionally allowed. A feature amount that is acquired by quantizing a normal vector, and is made robust such that a peripheral reference region is allowed can be achieved at a timing of either template creation or object recognition.

The template matching unit 304 searches for the position of the object 2 in an input image based on a template registered in the template DB 401 and a quantized normal direction feature amount acquired by the normal vector quantization unit 303, and acquires one or more collation results. Accordingly, the template matching unit 304 performs search processing for the number of templates registered in the template DB 401. In an embodiment, regarding all the templates registered in the template DB, the coordinates of the object 2 recognized in the input image and a collation score indicating the degree of matching of image features between the input image and a template for each of the coordinates are acquired as a collation result.

The recognition result output unit 305 outputs a final recognition result based on one or more collation results acquired by the template matching unit 304. In an embodiment, in the case where a plurality of collation results are acquired, regarding different collation results for the same coordinates, the recognition result output unit 305 determines that the template with the highest collation score has been recognized at the coordinates, and outputs a recognition result.

The storage apparatus 40 has the template DB 401. Templates for the respective viewpoints are stored in the template DB 401.

Template Registration Processing

Figure 5:
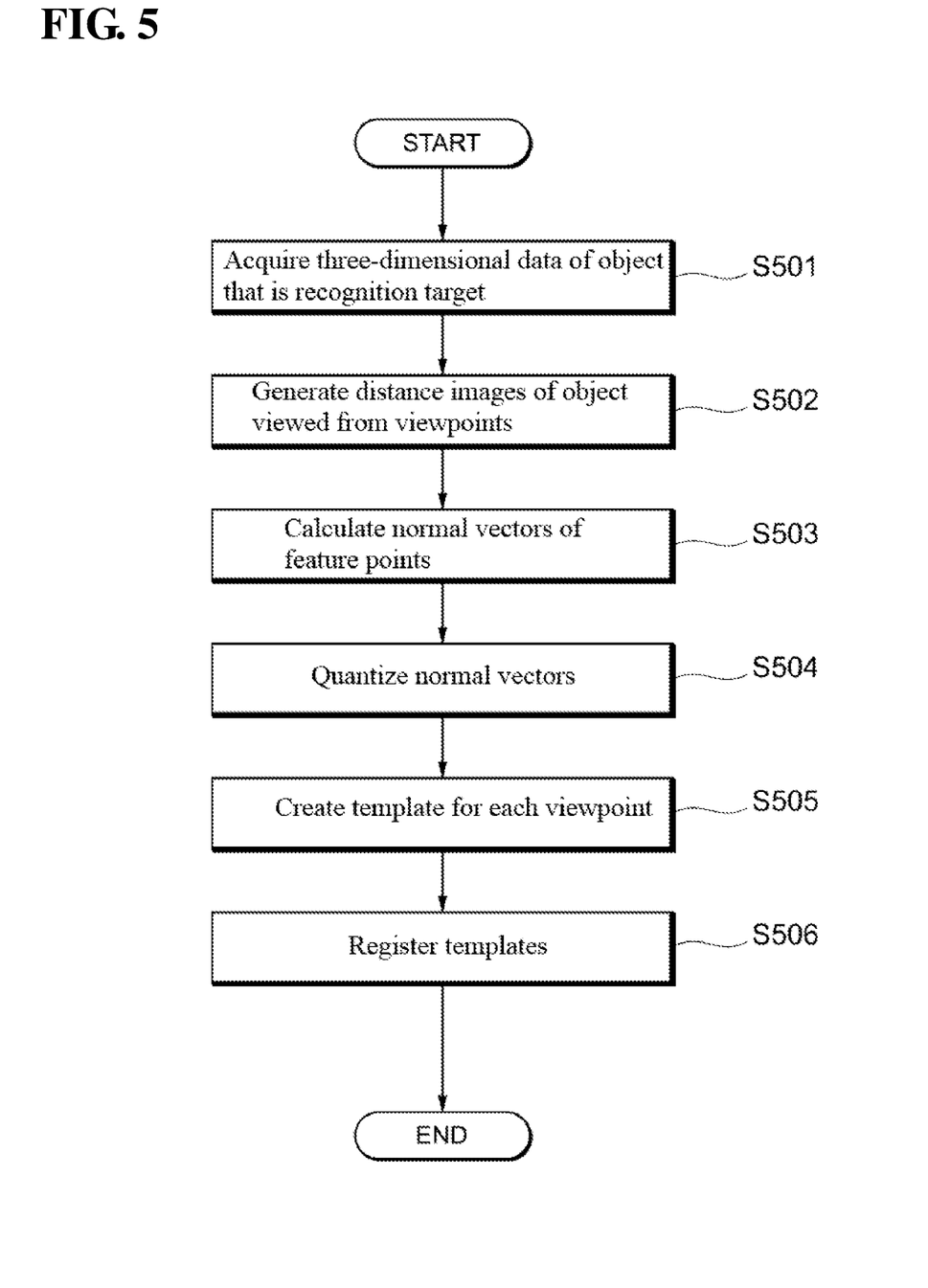
FIG. 5 is a flowchart illustrating a flow of template registration processing that is executed by a template creation apparatus.

Next, template registration processing that is executed by the template creation apparatus 20 will be described with reference to the flowchart in FIG. 5. Note that template registration processing shown in FIG. 5 is executed when a new image processing apparatus 10 is installed, or the object 2 that is a recognition target is changed.

In step S501, the three-dimensional data acquisition unit 201 of the template creation apparatus 20 acquires three-dimensional data of the object 2 that is a recognition target. For example, in an embodiment, the three-dimensional data acquisition unit 201 acquires three-dimensional CAD data from an external three-dimensional CAD server.

Next, in step S502, the distance image creation unit 202 of the template creation apparatus 20 creates distance images of an object viewed from predetermined viewpoints that have been set for the object, using three-dimensional data acquired by the three-dimensional data acquisition unit 201. In an embodiment, assume that the distance image creation unit 202 arranges viewpoints at 642 apices of a virtual 1280-hedron that is centered on the object 2, and generates distance images of the object viewed from the viewpoints.

Subsequently, in step S503, the normal vector calculation unit 203 of the template creation apparatus 20 calculates normal vectors of feature points of the object 2 viewed from a predetermined viewpoint that has been set for the object, based on the distance images of the respective viewpoints created by the distance image creation unit 202. In an embodiment, the normal vector calculation unit 203 calculates normal vectors of feature points of the object 2 viewed from a specific viewpoint, based on the distance images of the 642 viewpoints created by the distance image creation unit 202. As described above, in an alternative embodiment, normal vectors of feature points of the object 2 viewed from a specific viewpoint may be calculated based on three-dimensional data acquired by the three-dimensional data acquisition unit 201.

In step S504, the normal vector quantization unit 204 quantizes the normal vectors calculated by the normal vector calculation unit 203. In an embodiment, by mapping a normal vector in a unit sphere to a reference region on a two-dimensional space formed by the x and y axes as shown in FIG. 4B, the normal vector quantization unit 204 quantizes the direction of the normal vector, and acquires a quantized normal direction feature amount. Here, the angle Φ in FIG. 4A is an angle between the normal vector A and the z axis. In an embodiment, nine reference regions consisting of reference regions acquired by equally dividing, by eight, the XY plane that passes through the center of a unit sphere, and an additionally provided central reference region 9 in which sin Φ in the case where the angle Φ is set to 10 degrees serves as the radius r are used. Accordingly, the reference region includes the central reference region 9 and peripheral reference regions 1 to 8 formed by line segments that extend radially centered on the z axis at regular intervals.

After that, in step S505, the template creation unit 205 of the template creation apparatus 20 creates a template for each viewpoint based on a quantized normal direction feature amount acquired by the normal vector quantization unit 204. In an embodiment, the template creation unit 205 creates a template for each of the 642 viewpoints for which distance images were created.

Lastly, in step S506, the template information output unit 206 of the template creation apparatus 20 registers templates created by the template creation unit 205 to the template DB 401 of the storage apparatus. In an embodiment, the template creation unit 205 registers, for each viewpoint, data in an array format in which the quantized normal direction feature amounts of a plurality of feature points acquired in step S504 are written, to the template DB 401.

Object Recognition Processing

Figure 6:
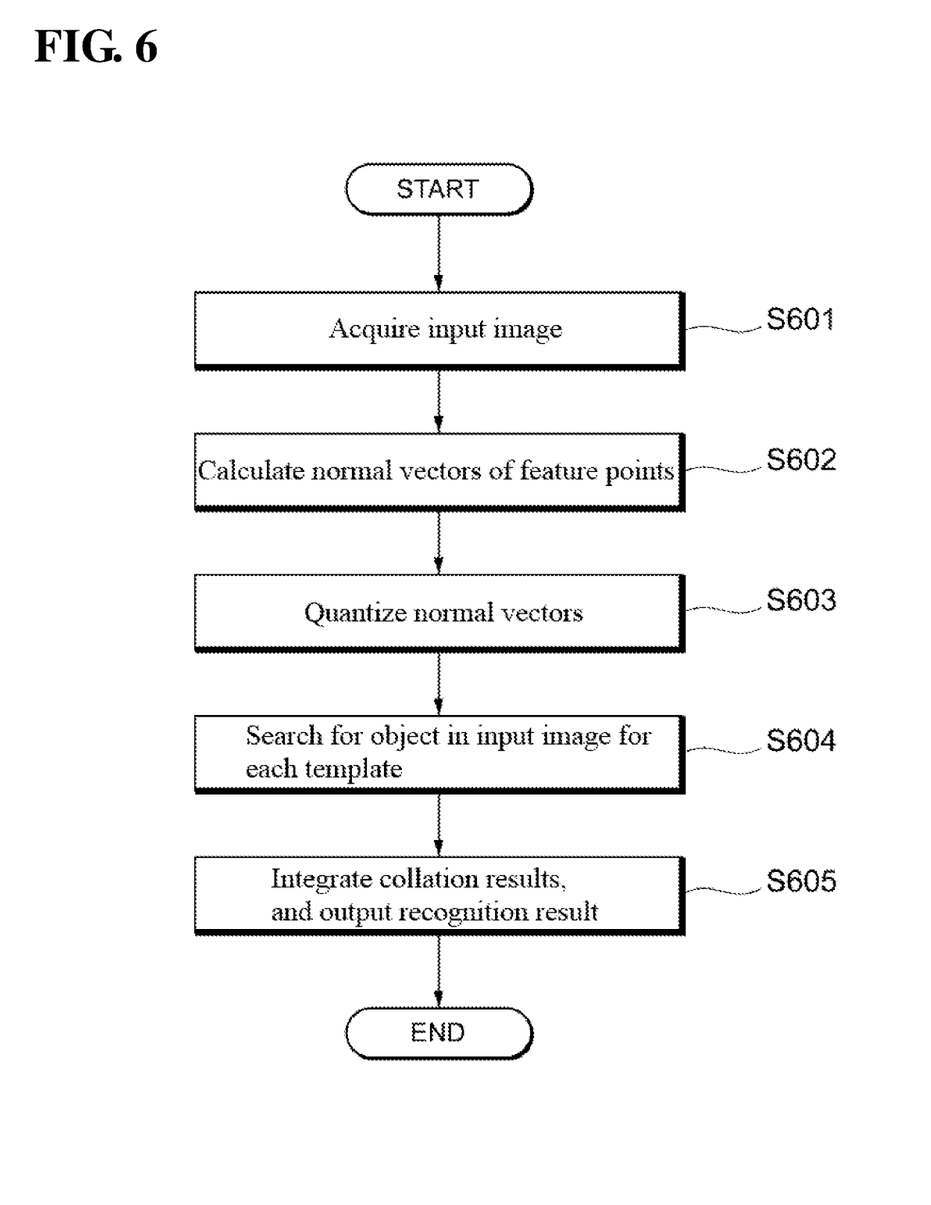
FIG. 6 is a flowchart illustrating a flow of object recognition processing that is executed by an object recognition processing apparatus.

Next, object recognition processing that is executed by the object recognition processing apparatus 30 will be described with reference to the flowchart in FIG. 6.

In step S601, the image acquisition unit 301 of the object recognition processing apparatus 30 acquires an input image from the camera 11. Next, in step S602, the normal vector calculation unit 302 of the object recognition processing apparatus 30 calculates normal vectors of feature points in the input image acquired by the image acquisition unit 301.

Subsequently, in step S603, the normal vector quantization unit 303 of the object recognition processing apparatus 30 quantizes the normal vectors calculated by the normal vector calculation unit 302. The normal vector quantization unit 303 quantizes the normal vectors, and acquires quantized normal direction feature amounts, using the reference regions used in step S504 by the normal vector quantization unit 204 when creating templates. In an embodiment, the normal vector quantization unit 303 uses nine reference regions consisting of reference regions acquired by equally dividing, by eight, the XY plane that passes through the center of the unit sphere, and an additionally provided central reference region 9 that is based on the angle $\Phi$ between the normal vector and the z axis.

After that, in step S604, the template matching unit 304 of the object recognition processing apparatus 30 searches for the position of the object 2 in the input image, based on templates registered in the template DB 401 and quantized normal direction feature amounts acquired by the normal vector quantization unit 303, and acquires one or more collation results. Accordingly, the template matching unit 304 performs search processing for the number of templates registered in the template DB 401. In an embodiment, regarding 642 templates registered in a template DB, coordinates of the object 2 recognized in the input image and a collation score indicating the degree of matching of image features between the input image and a template for each of the coordinates are acquired as a collation result.

Lastly, in step S605, the recognition result output unit 305 of the object recognition processing apparatus 30 integrates one or more collation results acquired by the template matching unit 304, and outputs a final recognition result. In an embodiment, regarding 642 collation results acquired from the 642 templates, in the case where different collation results are output on the same coordinates, the recognition result output unit 305 determines that the template with the highest collation score has been recognized on the coordinates, and outputs a recognition result.

Additional Embodiment

In an embodiment, in step S504, the normal vector quantization unit 204 of the template creation apparatus 20 quantizes a normal vector such that a reference region in the periphery of a reference region to which the normal vector that is a quantization target belongs is additionally allowed. For example, the normal vector quantization unit 204 quantizes the normal vector 1 in FIG. 4B such that not only a reference region 2 to which the normal vector 1 belongs, but also a reference region 3 to which the shortest distance from the endpoint of the normal vector 1 is the shortest among the other reference regions is allowed, and can thereby acquire a quantized normal direction feature amount (011000000). Similarly, the normal vector quantization unit 204 can quantize the normal vector 2 and acquire a quantized normal direction feature amount (000001100), and quantize the normal vector 3 and acquire a quantized normal direction feature amount (100000001).

With such a configuration, even in the case where, in step S603 at the time of object recognition, (001000000) is acquired as a feature amount corresponding to the normal vector 1 of the feature point 1 in the input image due to noise and a measurement error, the template matching unit 304 can calculate a collation score, and determine in step S604 that the normal vector 1 has not changed.

In an embodiment, an example has been described in which the normal vector quantization unit 204 performs quantization such that not only a reference region to which a normal vector belongs but also another reference region that is the closest among the other reference regions is allowed, but in an alternative embodiment, quantization may be performed such that the two closest reference regions are additionally allowed, among the other reference regions. In addition, the normal vector quantization unit 204 may perform quantization such that another reference region is allowed only if a predetermined condition is satisfied, for example, in a case where the shortest distance from the endpoint of a normal vector to another reference region is shorter than or equal to a predetermined threshold value, in place of performing quantization such that another reference region is allowed uniformly regarding all the normal vectors.

Furthermore, in an embodiment, an example has been described in which the normal vector quantization unit 204 of the template creation apparatus 20 realizes robust feature amounts, but, in an alternative embodiment, in place of the normal vector quantization unit 204 of the template creation apparatus 20, the normal vector quantization unit 303 of the object recognition processing apparatus 30 may realize robust feature amounts. By implementing robust feature amounts on the template creation apparatus side, it is possible to set a peripheral reference region that is allowed, without increasing the processing load at the time of object recognition. On the other hand, by implementing robust feature amounts on the object recognition processing apparatus side, it is possible to set a peripheral reference region that is allowed, based on conditions unique to each object recognition processing apparatus. Note that, by implementing robust feature amounts at any timing of either template creation or object recognition, a feature amount can be made robust, but an embodiment does not prohibit a feature amount from being made robust at the timing of both template creation and object recognition.

A program that implements various types of processing described in the present specification may be stored in a recording medium. With use of this recording medium, the above-mentioned program can be installed in the image processing apparatus 10. Here, the recording medium in which the above-mentioned program is stored may be a non-transitory recording medium. The non-transitory recording medium is not limited to a specific medium, and may be a recording medium such as a CD-ROM, for example.

Moreover, a portion or the entirety of the above embodiments can also be described as in the following supplemental descriptions, but is not limited thereto.

Supplemental Description 1

A template creation apparatus including at least one memory and at least one hardware processor connected to the memory, wherein the hardware processor acquires three-dimensional data indicating the three-dimensional shape of an object that is a recognition target, calculates a normal vector at a feature point of the object viewed from a predetermined viewpoint that has been set for the object, based on the three-dimensional data quantizes the calculated normal vector by mapping the calculated normal vector to a reference region on a plane orthogonal to an axis that passes through the viewpoint, so as to acquire a quantized normal direction feature amount, the reference region including a central reference region corresponding to the vicinity of the axis and a reference region in the periphery of the central reference region, creates, for each viewpoint, a template to be used for object recognition that is performed through template matching, based on the acquired quantized normal direction feature amount, and outputs the created template.

Supplemental Description 2

A template creation method including:

causing at least one or more hardware processors to acquire three-dimensional data indicating a three-dimensional shape of an object that is a recognition target, causing the hardware processors to calculate, based on the three-dimensional data, a normal vector at a feature point of the object viewed from a predetermined viewpoint that is set for the object, causing the hardware processors to quantize the calculated normal vector by mapping the calculated normal vector to a reference region on a plane orthogonal to an axis that passes through the viewpoint, so as to acquire a quantized normal direction feature amount, the reference region including a central reference region corresponding to the vicinity of the axis and a reference region in the periphery of the central reference region, causing the hardware processors to create, for each viewpoint, based on the acquired quantized normal direction feature amount, a template to be used for object recognition that is performed through template matching, and causing the hardware processors to output the created template.

The invention claimed is:

1. A template creation apparatus comprising a processor configured with a program to perform operations comprising:

operation as a three-dimensional data acquisition unit configured to acquire three-dimensional data indicating a three-dimensional shape of an object that is a recognition target;

operation as a normal vector calculation unit configured to calculate, based on the three-dimensional data, a normal vector at a feature point of the object viewed from a predetermined viewpoint that is set for the object;

operation as a normal vector quantization unit configured to quantize the calculated normal vector by mapping the calculated normal vector to a reference region on a plane orthogonal to an axis that passes though the viewpoint, so as to acquire a quantized normal direction feature amount, the reference region including a central reference region corresponding to the vicinity of the axis and a reference region in the periphery of the central reference region;

operation as a template creation unit configured to create, for each viewpoint, based on the acquired quantized normal direction feature amount, a template to be used for object recognition that is performed through template matching; and operation as a template information output unit configured to output the created template.

2. The template creation apparatus according to claim 1, wherein the processor is configured with the program such that the peripheral reference region includes a plurality of reference regions corresponding to a plurality of segments acquired by equally dividing a three-dimensional unit sphere.

3. The template creation apparatus according to claim 1, wherein the processor is configured with the program such that the central reference region is set based on an angle $\phi$ between a normal vector and the axis.

4. The template creation apparatus according to claim 3, wherein the processor is configured with the program such that the central reference region comprises a circle that is obtained in a case where the angle $\phi$ is set to a predetermined angle, and whose radius is $\sin \phi$.

5. The template creation apparatus according to claim 1, wherein the processor is configured with the program such that operation as the normal vector quantization unit comprises operation as the normal vector quantization unit that quantizes a normal vector such that a reference region in the periphery of a reference region to which the normal vector that is a quantization target belongs is additionally allowed.

6. An object recognition processing apparatus that performs object recognition using a template, the apparatus comprising a processor configured with a program to perform operations comprising:

operation as an image acquisition unit configured to acquire an input image;

operation as a normal vector calculation unit configured to calculate a normal vector at a feature point in the input image;

operation as a normal vector quantization unit configured to quantize the calculated normal vector by mapping the calculated normal vector to a reference region on a plane orthogonal to an optical axis of a camera that acquired the input image, so as to acquire a quantized normal direction feature amount, the reference region including a central reference region corresponding to the vicinity of the optical axis and a reference region in the periphery of the central reference region;

operation as a template matching unit configured to search for a position of the object in the input image based on the template and the quantized normal direction feature amount acquired by the normal vector quantization unit, and acquire a collation result; and operation as a recognition result output unit configured to output a recognition result that is based on the collation result.

7. The object recognition processing apparatus according to claim 6, wherein the processor is configured with the program such that the peripheral reference region includes a plurality of reference regions corresponding to a plurality of segments acquired by equally dividing a three-dimensional unit sphere.

8. The object recognition processing apparatus according to claim 6, wherein the processor is configured with the program such that the central reference region is set based on an angle $\phi$ between a normal vector and the optical axis.

9. The object recognition processing apparatus according to claim 8,
wherein the processor is configured with the program such that the central reference region comprises a circle that is obtained in a case where the angle $\phi$ is set to a predetermined angle, and whose radius is sin $\phi$.

10. The object recognition processing apparatus according to claim 6,
wherein the processor is configured with the program such that operation as the normal vector quantization unit comprises operation as the normal vector quantization unit that quantizes a normal vector such that a reference region in the periphery of a reference region to which the normal vector that is a quantization target belongs is additionally allowed.

11. A template creation method that is executed by a computer, comprising:
acquiring three-dimensional data indicating a three-dimensional shape of an object that is a recognition target;
calculating, based on the three-dimensional data, a normal vector at a feature point of the object viewed from a predetermined viewpoint that is set for the object;
quantizing the calculated normal vector by mapping the calculated normal vector to a reference region on a plane orthogonal to an axis that passes though the viewpoint, so as to acquire a quantized normal direction feature amount, the reference region including a central reference region corresponding to the vicinity of the axis and a reference region in the periphery of the central reference region;
creating, for each viewpoint, based on the acquired quantized normal direction feature amount, a template to be used for object recognition that is performed through template matching; and
outputting the created template.

12. The method according to claim 11, wherein the peripheral reference region includes a plurality of reference regions corresponding to a plurality of segments acquired by equally dividing a three-dimensional unit sphere.

13. The method according to claim 11, wherein the central reference region is set based on an angle $\phi$ between a normal vector and the axis.

14. The method according to claim 13, wherein the central reference region comprises a circle that is obtained in a case where the angle $\phi$ is set to a predetermined angle, and whose radius is sin $\phi$.

15. The method according to claim 11, further comprising quantizing a normal vector such that a reference region in the periphery of a reference region to which the normal vector that is a quantization target belongs is additionally allowed.

16. A non-transitory computer-readable storage medium storing a program for causing a computer to perform operations comprising:
acquiring three-dimensional data indicating a three-dimensional shape of an object that is a recognition target;
calculating, based on the three-dimensional data, a normal vector at a feature point of the object viewed from a predetermined viewpoint that is set for the object;
quantizing the calculated normal vector by mapping the calculated normal vector to a reference region on a plane orthogonal to an axis that passes though the viewpoint, so as to acquire a quantized normal direction feature amount, the reference region including a central reference region corresponding to the vicinity of the axis and a reference region in the periphery of the central reference region;
creating, for each viewpoint, based on the acquired quantized normal direction feature amount, a template to be used for object recognition that is performed through template matching; and
outputting the created template.

* * * * *